US 11,305,472 B2

(12) United States Patent
Kako et al.

(10) Patent No.: US 11,305,472 B2
(45) Date of Patent: Apr. 19, 2022

(54) METHOD FOR CONTROLLING INJECTION MOLDING MACHINE AND INJECTION MOLDING MACHINE

(71) Applicant: Kabushiki Kaisha Meiki Seisakusho, Aichi (JP)

(72) Inventors: Minetoshi Kako, Tokai (JP); Yasuhiro Yabuki, Nissin (JP); Tomohiro Soeda, Nagoya (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 547 days.

(21) Appl. No.: 16/190,310

(22) Filed: Nov. 14, 2018

(65) Prior Publication Data

US 2019/0152112 A1 May 23, 2019

(30) Foreign Application Priority Data

Nov. 21, 2017 (JP) .............................. JP2017-223667

(51) Int. Cl.
*B29C 45/76* (2006.01)
*B29C 45/67* (2006.01)

(52) U.S. Cl.
CPC .......... *B29C 45/7653* (2013.01); *B29C 45/67* (2013.01); *B29C 2945/76086* (2013.01);
(Continued)

(58) Field of Classification Search
None
See application file for complete search history.

(56) References Cited

U.S. PATENT DOCUMENTS 3,287,486 A * 11/1966 Jurgeleit ................. B29C 33/24
264/325
3,743,469 A * 7/1973 Gibbons ................. B29C 45/68
425/451.2
(Continued)

FOREIGN PATENT DOCUMENTS

CN 101402245 A 4/2009
CN 105965807 A 9/2016
(Continued)

OTHER PUBLICATIONS

Machine English Translation of JP2008110498, Accessed Apr. 16, 2021 (Year: 2008).*
(Continued)

*Primary Examiner* — Francisco W Tschen
*Assistant Examiner* — Adrianna N Konves
(74) *Attorney, Agent, or Firm* — Renner, Otto, Boisselle & Sklar, LLP

(57) ABSTRACT

In an injection molding machine that transmits driving force of a mold opening/closing servo motor to a movable platen via a ball screw to move the movable platen with respect to a stationary platen, and thereafter clamps molds by a mold clamping mechanism, provided is a control method capable of detecting a position of the movable platen at a time of continuous molding and correcting the operation start confirming position. In a method for controlling an injection molding machine that transmits driving force of a mold opening/closing servo motor to a movable platen via a ball screw to move the movable platen with respect to a stationary platen, and thereafter clamps molds by a mold clamping mechanism, other control is performed using a position A of the movable platen, the position A being detected by a position sensor at a time of continuous molding, and the position A of the movable platen is corrected.

5 Claims, 5 Drawing Sheets

(52) U.S. Cl.
CPC .............. *B29C 2945/76227* (2013.01); *B29C 2945/76391* (2013.01); *B29C 2945/76461* (2013.01); *B29C 2945/76568* (2013.01); *B29C 2945/76869* (2013.01); *B29C 2945/76936* (2013.01)

(56) References Cited

U.S. PATENT DOCUMENTS

| | | | |
|---|---|---|---|
| 4,345,890 A | * | 8/1982 | Hemmi .................. B22D 17/26 100/214 |
| 7,001,545 B2 | | 2/2006 | Okado et al. |
| 2009/0087510 A1 | | 4/2009 | Hakoda et al. |

FOREIGN PATENT DOCUMENTS

| | | | |
|---|---|---|---|
| EP | 3067181 A1 | | 9/2016 |
| JP | 1990041919 U | | 3/1990 |
| JP | 07148740 A | | 6/1995 |
| JP | H07148740 A | * | 6/1995 |
| JP | 2004017396 A | | 1/2004 |
| JP | 2008-110498 A | | 5/2008 |
| JP | 2013-27993 A | | 2/2013 |

OTHER PUBLICATIONS

Machine English Translation of JPH07148740A, Accessed Oct. 1, 2021 (Year: 1995).*

\* cited by examiner

METHOD FOR CONTROLLING INJECTION MOLDING MACHINE AND INJECTION MOLDING MACHINE

CROSS REFERENCE TO RELATED APPLICATIONS

This application claims the priority benefit of Japanese Patent Application No. 2017-223667, filed on Nov. 21, 2017. The entirety of the above-mentioned patent application is hereby incorporated by reference herein and made a part of this specification.

BACKGROUND OF THE INVENTION

(1) Field of the Invention

The present invention relates to a method for controlling an injection molding machine that transmits driving force of a mold opening/closing servo motor to a movable platen via a ball screw to move the movable platen with respect to a stationary platen, and thereafter clamps molds by a mold clamping mechanism, and relates to the injection molding machine.

(2) Description of Related Art

An injection molding machine described in Japanese Patent Application Laid-Open No. 2004-17396 (0026, FIG. 1) is known as an injection molding machine that transmits driving force of a mold opening/closing servo motor to a movable platen via a ball screw to move the movable platen with respect to a stationary platen, and thereafter clamps molds by a mold clamping mechanism. In Japanese Patent Application Laid-Open No. 2004-17396 (0026, FIG. 1), as described in (0026) and (FIG. 1), a mold opening/closing mechanism is provided, which is composed of a servo motor, a screw feeding mechanism, a hydraulic side cylinder and the like. However, Japanese Patent Application Laid-Open No. 2004-17396 (0026, FIG. 1) does not consider or describe thermal expansion of a metal mold, the ball screws and the like or correction of a control start position at the time of molding.

Moreover, a mold clamping device described in Japanese Patent Application Laid-Open No. H7-148740 (claim 1, 0030, FIG. 4, published in 1995) is known as such a device that deals with the thermal expansion of the metal mold at the time of molding. However, Japanese Patent Application Laid-Open No. H7-148740 (claim 1, 0030, FIG. 4, published in 1995) does not describe such a machine that transmits the driving force of the mold opening/closing servo motor to the movable platen via the ball screws to move the movable platen with respect to the stationary platen, and never considers or describes the thermal expansion of the metal mold, ball screws and the like of the injection molding machine provided with the above-described structure or the correction of the control start position, which follows the thermal expansion.

SUMMARY OF THE INVENTION

In the conventional injection molding machine that transmits the driving force of the mold opening/closing servo motor to the movable platen via the ball screws to move the movable platen with respect to the stationary platen, and thereafter clamps the molds by the mold clamping mechanism, when an operation start confirming position for enabling operation of the next actuator such as a mold clamping mechanism cannot be confirmed, a step of operating the next actuator cannot be started. However, in the conventional injection molding machine, at the time of closing the mold, in some cases, mold matching is performed at a frontward position where the operation start confirming position detected by the mold opening/closing servo motor cannot be confirmed due to the thermal expansion of the metal mold, the ball screws and the like, resulting in stoppage of the mold. As described above, the conventional injection molding machine has had a problem to be solved.

In view of the problem described above, an object of the present invention is to provide a method for controlling an injection molding machine that transmits driving force of a mold opening/closing servo motor to a movable platen via a ball screw to move the movable platen with respect to a stationary platen, and thereafter clamps molds by a mold clamping mechanism, wherein a position of the movable platen can be detected at the time of continuous molding, and the operation start confirming position can be corrected.

A method for controlling an injection molding machine according to claim 1 of the present invention is a method for controlling an injection molding machine that transmits driving force of a mold opening/closing servo motor to a movable platen via a ball screw to move the movable platen with respect to a stationary platen, and thereafter clamps molds by a mold clamping mechanism, wherein other control is performed using a position of the movable platen, the position being detected by a position sensor at a time of continuous molding, and the position of the movable platen is corrected.

A method for controlling an injection molding machine according to claim 2 of the present invention is a method for controlling an injection molding machine that transmits driving force of a mold opening/closing servo motor to a movable platen via a ball screw to move the movable platen with respect to a stationary platen, and thereafter clamps molds by a mold clamping mechanism, wherein an operation start confirming position of other actuator is confirmed based on a position of the movable platen, the position being detected at a time of continuous molding by a rotary encoder additionally provided on the mold opening/closing servo motor, and the operation start confirming position is corrected.

A method for controlling an injection molding machine according to claim 3 of the present invention is the method for controlling an injection molding machine according to claim 2, wherein the other actuator is a mold clamping cylinder, the mold clamping cylinder is enabled to operate when it is determined that the movable platen has reached the operation start confirming position of the mold clamping cylinder, and the operation start confirming position of the mold clamping cylinder is corrected during a period of any molding cycle at the time of the continuous molding.

An injection molding machine according to claim 4 of the present invention is an injection molding machine that transmits driving force of a mold opening/closing servo motor to a movable platen via a ball screw to move the movable platen with respect to a stationary platen, and thereafter clamps molds by a mold clamping mechanism, the injection molding machine comprising: a rotary encoder additionally provided on the mold opening/closing servo motor and capable of detecting a position of the movable platen; other actuator that performs an operation of the injection molding machine, the operation being of other than the mold opening/closing servo motor; and a control device that enables the other actuator to operate when it is confirmed that the movable platen has reached an operation start confirming position of the other actuator and detects a position of the movable platen at a time of continuous molding to correct the operation start confirming position.

An injection molding machine according to claim 5 of the present invention is the injection molding machine according to claim 4, wherein either one of the mold opening/closing servo motor and a ball screw nut through which a ball screw is inserted is disposed on a bed or the stationary platen, and other of the mold opening/closing servo motor and the ball screw nut is disposed on the movable platen.

The method for controlling an injection molding machine according to the present invention is the method for controlling the injection molding machine that transmits the driving force of the mold opening/closing servo motor to the movable platen via the ball screws to move the movable platen with respect to the stationary platen, and thereafter clamps the mold by the mold clamping mechanism, wherein the other control is performed using the position of the movable platen, which is detected by the position sensor at the time of the continuous molding, and in addition, the position of the movable platen is corrected. Accordingly, the method for controlling an injection molding machine according to the present invention can deal with the thermal expansion of the metal mold, the ball screws and the like at the time of the continuous molding.

DETAILED DESCRIPTION OF PREFERRED EMBODIMENTS

Figure 1:
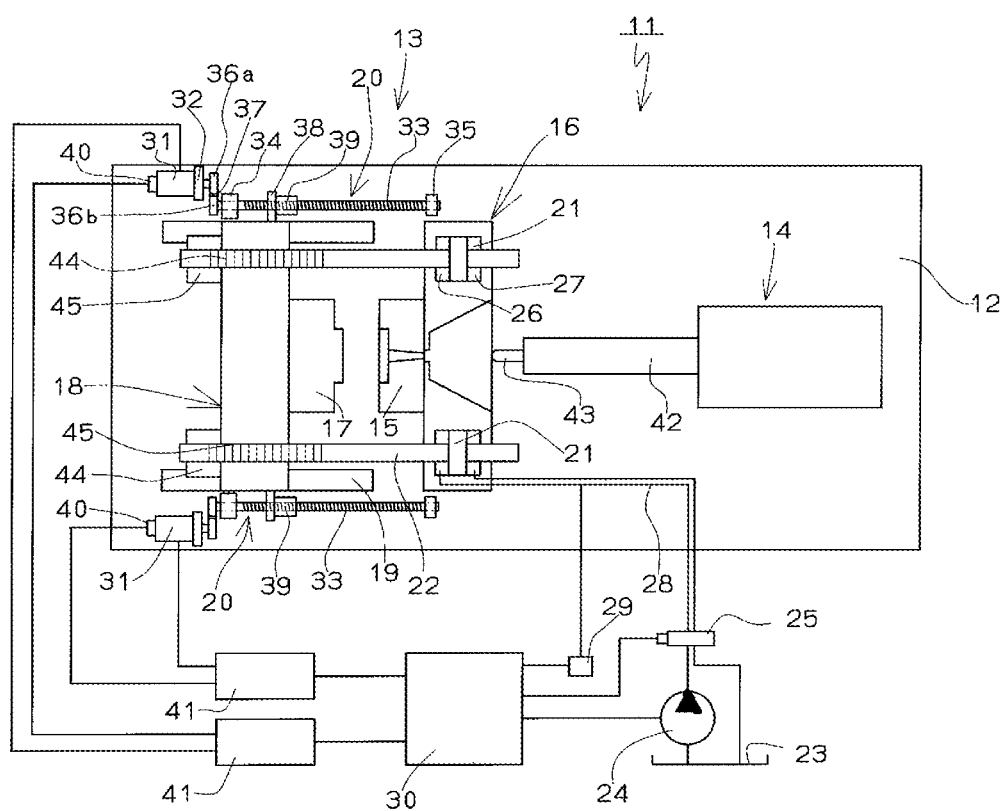
FIG. 1 is a schematic plan view of an injection molding machine according to a first embodiment of the present invention.

An injection molding machine 11 according to an embodiment of the present invention will be described with reference to FIG. 1. The injection molding machine 11 of a horizontal type is composed of a mold clamping device 13 and an injection device 14, which are disposed on a bed 12. In the mold clamping device 13, a stationary platen 16 attached with a stationary metal mold 15 is stationarily disposed on the bed 12. Moreover, a movable platen 18 attached with a movable metal mold 17 is provided with respect to the stationary platen 16 so as to be movable on guides 19 on an upper surface of the bed in a mold opening/closing direction.

Mold clamping cylinders 21 which are actuators of a mold clamping mechanism are individually provided near four corners of the stationary platen 16, and rods of the mold clamping cylinders 21 constitute tie bars 22. Then, the above-described tie bars 22 are inserted through guide holes near four corners of the movable platen 18. Each of the mold clamping cylinders 21 is hydraulically operated, in which hydraulic oil is supplied from a pump 24, which is connected to a tank 23, via a switching valve 25 to a mold clamping-side oil chamber 26 or mold opening-side oil chamber 27 of the mold clamping cylinder 21. Moreover, an oil pressure sensor 29 is provided in a pipeline 28 toward at least the mold clamping-side oil chambers 26 of the mold clamping cylinders 21. The oil pressure sensor 29 is connected to a control device 30. Note that a hydraulic circuit in FIG. 1 is a circuit in which only main portions regarding the invention are illustrated, and a hydraulic circuit according to the present invention is not limited to this. Moreover, a mold clamping mechanism according to the present invention is not limited to the mold clamping cylinders 21 in FIG. 1, either. As an example, the mold clamping mechanism may be a mechanism that operates a toggle mechanism or a wedge mechanism using an electric motor as an actuator, or may be a mechanism using an electromagnet.

Moreover, on a region near the movable platen 18 on the bed 12, mold opening/closing servo motors 31 which are actuators of mold opening/closing mechanisms 20 are disposed. More specifically, on an operation side and a non-operation side on outsides of the guides 19 on the bed 12, motor attaching brackets 32 are provided respectively. The mold opening/closing servo motors 31 are fixed to the brackets 32. Note that, when a tie bar holder that holds four tie bars 22 on an outside of the movable platen 18 is provided, the mold opening/closing servo motor 31 may be fixed to the tie bar holder. Moreover, a pair of ball screw holding portions 34 and 35 into which bearings 34a and 35a (not shown) are built is fixed to two spots in the mold opening/closing direction on the bed 12. Then, the ball screws 33 disposed parallel to the guides 19 are rotatably held by the bearings described above. Note that one of the bearings may be made displaceable in the mold opening/closing direction and may be made capable of dealing with the thermal expansion of the ball screw 33. Then, a belt 37 is wound around a drive pulley 36a of the mold opening/closing servo motor 31 and a driven pulley 36b on one end side of the ball screw 33, whereby driving force of the mold opening/closing servo motor 31 is transmitted to the ball screw 33.

Moreover, brackets 38 are fixed to both of side surfaces of the movable platen 18, and ball screw nuts 39, 39 are fixed to the brackets 38 described above. Then, intermediate portions of the ball screws 33 are inserted through the ball screw nuts 39. Note that a relationship between each mold opening/closing servo motor 31 and each ball screw 33 may be a relationship where the ball screw 33 is serially and directly connected to a drive shaft of the mold opening/closing servo motor 31. Moreover, the mold opening/closing servo motor 31 may be directly fixed to a portion near the movable platen 18 on the bed 12 or to the stationary platen 16. In the case of stationarily providing the mold opening/closing servo motor to the stationary platen 16, frequently, a tip end side of the ball screw is held by only the ball screw nut near the movable platen, and becomes a free end. However, a setting device for inputting molding conditions and varieties of wires and pipes for the metal molds 15 and 17 are provided on and near the stationary platen 16, and a work space for an operator is also required there. Accordingly, it is frequent that it is advantageous to provide the mold opening/closing servo motor 31 near the movable platen 18. Moreover, the mold opening/closing servo motor may be disposed on the movable platen 18, and the ball screw nut may be disposed on the stationary platen and the bed. However, since wiring for the mold opening/closing servo motor becomes complicated in that case, it is frequent that it is advantageous to provide the mold opening/closing servo motor near the bed 12. In general, the number of mold opening/closing mechanisms (the number of mold opening/closing servo motors) is two as in the present embodiment. However, the number is not limited to two, and may be arbitrary (for example, 1 to 4).

A rotary encoder 40 that detects the number of revolutions (rotation angle) of each mold opening/closing servo motor 31 is additionally provided thereto, and a position of the movable platen 18 is made detectable by the rotary encoder 40. The mold opening/closing servo motor 31 and the rotary encoder 40 are connected to each of servo amplifiers 41 each of which constitutes a part of the control device 30, and are subjected to closed loop control by a command value from each servo amplifier 41. Moreover, the servo amplifiers 41 are connected to the upper control device 30. Note that a type of the rotary encoders 40 includes an absolute type, an incremental type and the like, and is not limited.

On an outside of the stationary platen 16 (that is, on an opposite side of the stationary platen 16 with an attachment surface of the stationary metal mold 15), there is formed a recessed portion (mortar portion) into which a heating cylinder 42 and nozzle 43 of the injection device 14 are insertable. Moreover, a locking portion 44 composed of a plurality of grooves is provided on an outer circumference of each tie bar 22. Meanwhile, half nuts 45 which are coupling means are provided around portions on a wall surface on an outside of the movable platen 18 (that is, on an opposite side of the movable platen 18 with an attachment surface of the movable metal mold 17), the portions allowing the tie bars 22 to be inserted therethrough. Each of the half nuts 45 includes a plurality of locking teeth, and is moved forward and backward by another actuator (not shown), whereby the locking teeth are locked with the locking portion 44 of the tie bar 22.

Next, a description will be given of a method for controlling the injection molding machine 11 according to the present embodiment, and particularly, of a method for controlling the mold clamping device 13. Before a molding cycle shown in FIG. 2, which is performed at the time of the continuous molding, is started, when the metal molds 15 and 17 are attached to the stationary platen 16 and the movable platen 18, then the mold opening/closing servo motors 31 of the mold opening/closing mechanisms 20 are operated in accordance with a manual molding mode, and the movable platen 18 and the movable metal mold 17 are moved in a mold closing direction, and are subjected to mold matching. Then, a mold thickness dimension is measured by the rotary encoders 40 of the mold opening/closing servo motors 31, and at the same time, a mold closing completion position A0 is set. Then, on a positive side from the mold closing completion position A0 taken as an origin (0 point), there are set a mold opening completion position, and a high-speed section, a low-speed section and a metal mold protection section (or switching positions between the respective sections) at the time of mold opening and closing. Moreover, a moving speed and others of the movable platen 18 at the time when the movable platen 18 moves for the mold opening and closing are set. Moreover, here, the mold closing completion position A0 is the operation start confirming position of the mold clamping cylinders 21 of the mold clamping mechanisms. Note that the mold closing completion position A0 may be set to a position (value) slightly offset to the positive side (mold opening side) from a position (value) where mold abutment is performed. Moreover, in terms of a relationship, the mold closing completion position A0 and the operation start confirming position of the mold clamping cylinders 21 do not need to be the same, and the operation start confirming position of the mold clamping cylinders 21 may be provided at a position apart from the mold closing completion position A0 to the mold opening side by a predetermined distance that is very slight. In that case, it is rare that the operation start confirming position is provided independently, and at the same time when the mold closing completion position A0 is set, the operation start confirming position is automatically set to a position apart therefrom by the predetermined distance. Hence, even if the operation start confirming position of the mold clamping cylinders 21 is not the same as the mold closing completion position A0, mostly, the operation start confirming position of the mold clamping cylinders 21 is substantially included in the concept of the mold closing completion position A0.

Then, a mold clamping operation is performed in accordance with the manual molding mode, and a preset position where a hydraulic oil pressure (or a detected value of mold clamping force) reaches a setting value is read as a mold clamping completion position B0. Moreover, at the same time, a difference between the mold clamping completion position B0 and the mold closing completion position A0 is also arithmetically operated and stored. It is needless to say that, besides the above, various settings are also made for the injection device and peripheral instruments until the molding is started.

When the above-described settings are made, and the molding is performed a certain number of times in accordance with the manual molding mode and a semi-automatic molding mode to then achieve good molded products, then the operation proceeds to an automatic molding mode (continuous molding). However, the above-described molding according to the manual molding mode and the semi-automatic molding mode is performed only a certain number of times. Accordingly, even if the metal molds 15 and 17 are subjected to temperature control by a temperature control medium when the operation proceeds to the automatic molding mode, the entire metal mold is not completely heated up by also being affected by a molten resin. Moreover, the ball screws 33 and the like of the mold opening/closing mechanisms 20 are not operated many times, and accordingly, are not heated up by being affected by frictional heat generated by sliding thereof.

In the automatic molding mode (continuous molding), a previous molded product is taken out from the movable metal mold 17 at the mold opening completion position shown in FIG. 1, and thereafter, the operation proceeds to a mold closing step. In the mold closing step, a signal is sent from the control device 30 via the servo amplifiers 41 to the mold opening/closing servo motors 31, and the mold opening/closing servo motors 31 start to operate (S1). The operation of the mold opening/closing servo motors 31 moves the movable platen 18 and the movable metal mold 17 toward the mold closing direction. At this time, by the rotary encoders 40 of the mold opening/closing servo motors 31, the position of the movable platen 18 is detected, and the closed loop control is performed. Then, the high-speed section, the low-speed section and the metal mold protection section are controlled by a set speed or torque. Then, it is confirmed and determined whether a detection position by the rotary encoders 40 reaches a mold closing completion position A0±α obtained by adding a correction value to the initially set mold closing completion position A0 (S2). When it is confirmed and determined that the detection position has reached the mold closing completion position A0±α (S2=Y), then the mold opening/closing servo motors 31 stop operating (S3).

Meanwhile, when a predetermined time has elapsed (S4) without enabling the rotary encoders 40 to confirm the mold closing completion position A0±α (S2=N) though a position control command to the mold closing completion position A0±α is given to the mold opening/closing servo motors 31, then, it is determined that abnormality has occurred, and the cycle is stopped (S5).

Figure 2:
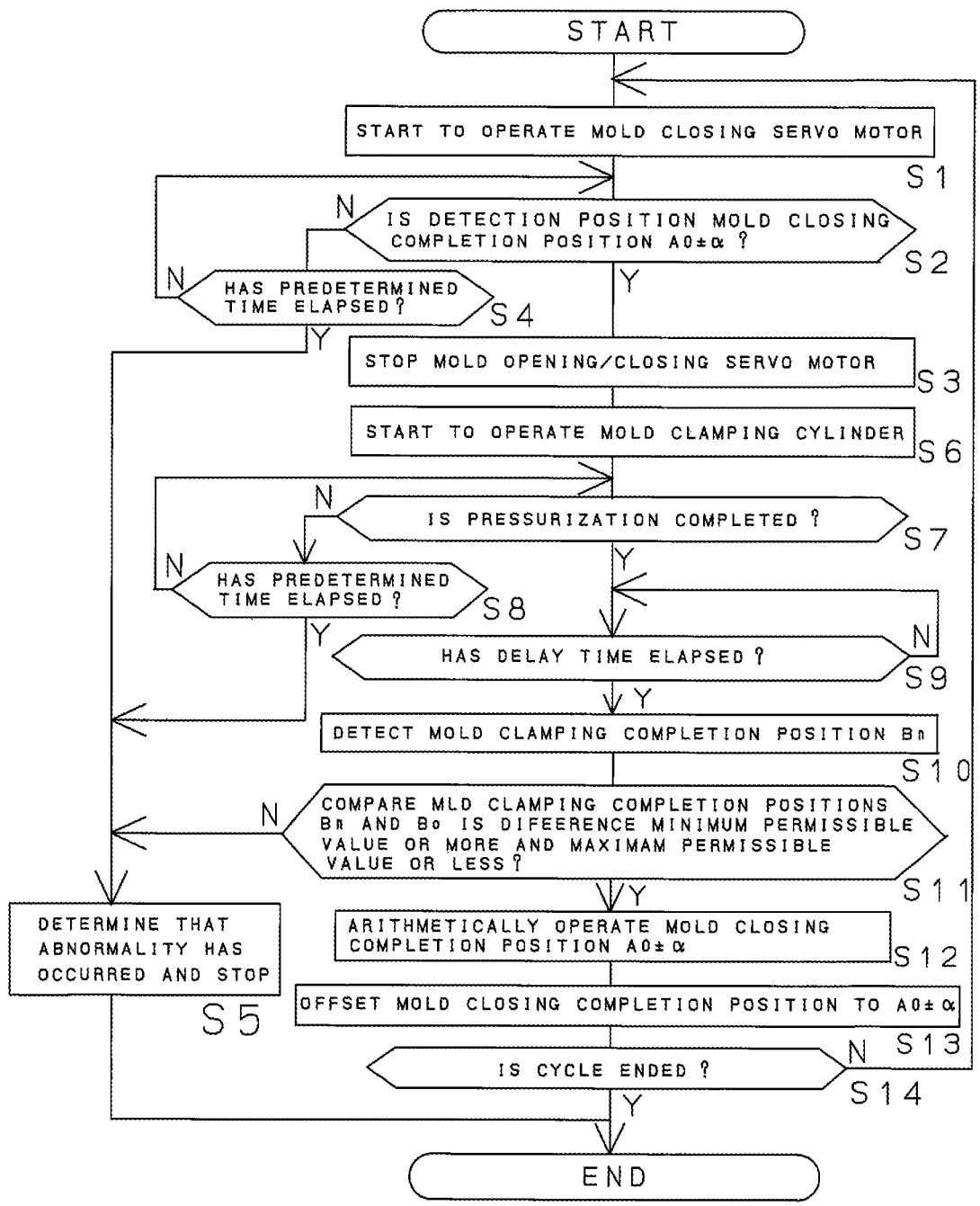
FIG. 2 is a flowchart of a method for controlling an injection molding machine according to the present invention.

Then, when the mold closing completion position A0±α is detected/confirmed, and the mold opening/closing servo motors 31 stop operating, then though not shown in a flowchart in FIG. 2, hydraulic cylinders and the like (other actuators, not shown) which are drive sources for the half nuts 45 are operated, and the half nuts 45 are engaged with the locking portions 44 of the tie bars 22. Completion of the engagement of the half nuts 45 is also detected by proximity switches and the like. Then, moreover, when the mold closing completion position A0±α is detected, then the hydraulic oil is supplied from the pump via switching valves to the mold clamping-side oil chambers 26 of the mold clamping cylinders 21, and the operation is started. As a result, the movable metal mold 17 is made to abut against the stationary metal mold 15 via the locking portions 44 of the tie bars 22, the half nuts 45 and the movable platen 18. After being made to abut against the stationary metal mold 15, the movable metal mold 17 is pressed, and a pressure of each of the mold clamping cylinders 21, which is detected by the oil pressure sensor 29, is also increased. At this time, the mold opening/closing servo motors 31 are set free; however, may continue to operate while detecting the position of the movable metal mold 17.

Then, when a detected value by the oil pressure sensor 29 is transmitted to the control device 30, and the detected value reaches a set pressure (S7=Y), then it is determined that the mold clamping is completed. Moreover, when the predetermined time has elapsed without the detected value reaching the set pressure (when the mold clamping is not completed) (S8=Y), then it is determined that abnormality has occurred, and the molding cycle is discontinued (S5). After the mold clamping is completed, it is determined whether a delay time for stabilizing the pressure has elapsed (S9), and after the elapse of the delay time (S9=Y), a mold clamping completion position Bn is detected (S10). Note that the reason why the mold clamping completion position Bn is detected and used for the control after the elapse of the delay time (S9=Y) is that the position is detected stably. Then, a comparative arithmetic operation is performed between the detected mold clamping completion position Bn and a stored mold clamping completion position B0. Then, when a difference between the newly detected mold clamping completion position Bn and the previously stored mold clamping completion position B0 is a preset minimum permissible value or more and a preset maximum permissible value or less (S11=Y), the difference is regarded as a normal value. In that case, for the mold opening completion position A0 initially set by adding a predetermined value to the mold clamping completion position Bn (or B0), the correction value A0±α to be added thereto or subtracted therefrom is arithmetically operated (S12). Then, an offset value is temporarily stored as the mold closing completion position A0±α for use at the time of the next molding. Moreover, when the detected value of the mold clamping completion position Bn is lower than the preset minimum permissible value or higher than the preset maximum permissible value (S11=N), the detected value is regarded as an abnormal value, and the continuous molding is stopped (S5).

Note that, in the flowchart in FIG. 2, omitted is a description of subsequent mold clamping step (including an injection step and a cooling step), strong mold opening step, mold opening step and the like. Then, during a period while the molding cycle is continued by the continuous molding (S14=N), the mold closing step in the next molding cycle is performed using the mold closing completion position A0±α arithmetically operated every time. Note that, with regard to the arithmetic operation (correction) of the offset value of the mold closing completion position A0, the mold clamping completion position Bn detected with respect to the mold clamping completion position B0 may be overwritten and stored, and at the time of the next molding, the detected value may be comparatively arithmetically operated for the stored mold clamping completion position Bn. Moreover, also with regard to the mold closing completion position A0±α, the mold closing completion position A0±a may be overwritten and stored with respect to an initial setting value A0, and at the time of the next molding, a correction value a may be further added to (or subtracted from) the mold closing completion position A0±α. The correction of the mold closing completion position in that case may be performed in every molding cycle of an automatic operation mode (continuous operation), or may be performed once every plural molding cycles. Moreover, desirably, the offset (correction) of the mold closing completion position A0 is automatically performed; however, a part of the offset may be manually performed in consideration of conditions such as an air temperature difference, the number of molding cycles, and a metal mold temperature.

Figure 3:
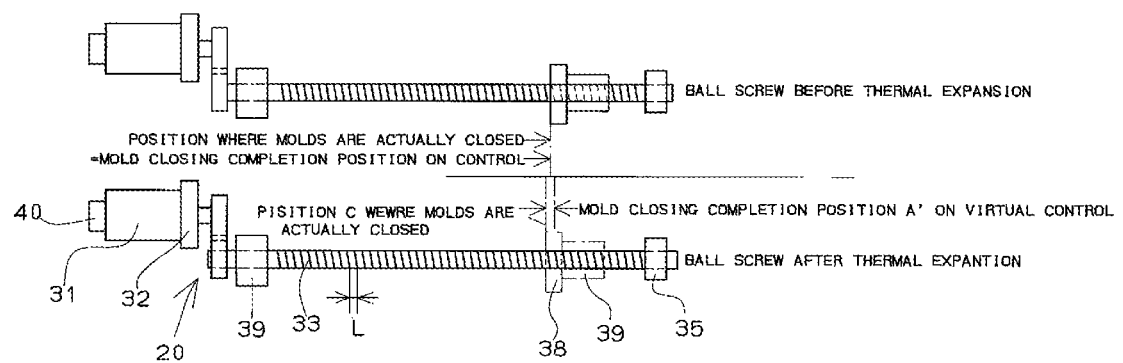
FIG. 3 is an explanatory view illustrating thermal expansion of a ball screw and a metal mold of the injection molding machine according to the present invention and a state of the ball screw and the metal mold at a time of closing the mold.

Next, with reference to FIG. 3, a description will be given of a relationship, at the time of the continuous molding, between the thermal expansion of the metal molds 15 and 17 and the ball screws 33 and the operation start confirming positions of the other actuators than the mold opening/closing servo motors. Here, the operation start confirming positions are confirmed together with the detection of the mold closing completion position A0±α. FIG. 3 is a view showing enlarged main portions of the injection molding machine 11 in FIG. 1. The stationary platen 16 is located on a right side of FIG. 3, and the movable platen 18 is located on a left side of FIG. 3. Note that, in FIG. 3, the thermal expansion of the ball screws 33 is illustrated more exaggeratedly and clearly than actual. As described in Japanese Patent Application Laid-Open No. H7-148740 (claim 1, 0030, FIG. 4), at the time of the continuous molding, the metal molds 15 and 17 are gradually heated, and thermally expand as being heated. Meanwhile, the stationary platen 16 is stationarily attached to the bed 12, and accordingly, thermally expanded portions of the metal molds 15 and 17 extend toward the movable platen 18 (leftward in FIG. 3). As a result, positions of the stationary metal mold 15 and the movable metal mold 17 become positive detected values when the initial mold closing completion position A0 is taken as the 0 point and extension toward the mold opening side is displayed as a positive value.

Meanwhile, the ball screws 33 are gradually heated by sliding friction at the time of the continuous molding, and thermally expand as being heated. In contrast, the bed 12 is not heated so much even at the time of the continuous molding, and also gives a small influence of the thermal expansion. Accordingly, an influence of the thermal expansion of the ball screws 33 becomes relatively large. In the present embodiment, the ball screws 33 are axially held on the movable platen side and the stationary platen side.

However, a certain type of ball screws which are not provided to be displaceable in the mold opening/closing direction extend toward both sides by an amount including tolerances of bearings and attachment portions. Then, as the ball screws 33 extend, a lead L (pitch) is also increased in the same ratio together with an overall length of the ball screws 33. Moreover, an opening/closing stroke of the movable platen 18 is a length equal to or longer than a half of an effective length of each of the ball screws 33. As a result, when the mold opening/closing servo motors 31 are given command values with the same mold closing amount from the mold opening completion position toward the mold closing completion position A, and are driven by the same number of revolutions using the detected values of the rotary encoders 40 to advance the movable platen, then a mold closing completion position A' (target position) of the movable platen 18 on virtual control should be a position more on a negative side (stationary platen side) than the initial mold closing completion position A.

However, as described above, the metal molds 15 and 17 also thermally expand toward the positive side (movable platen side). When the stationary metal mold 15 and the movable metal mold 17 are actually caused to abut against each other, a position detected by the rotary encoders 40 of the mold opening/closing servo motors 31 (that is, a position C where the molds are actually closed) becomes a position that does not reach the target position by the number of revolutions according to the initial command value. From this matter, the control device 30 unfortunately determines that the movable platen 18 is not detected to reach the mold closing completion position A' though the stationary metal mold 15 and the movable metal mold 17 are actually caused to abut against each other (S2, S4 and S5 in the flowchart of FIG. 2).

Accordingly, in the present embodiment, in response to the movement of the mold clamping completion position Bn more to the movable platen side than the previous mold clamping completion position B0, the movement being caused by the thermal expansion of the metal molds 15 and 17 and the ball screws 33 during the continuous molding, the mold closing completion position A0±α calculated by the arithmetic operation is also corrected more to the movable platen 18 side than the previous mold closing completion position A0. However, with regard to the correction of the mold closing completion position A0, the mold clamping completion position Bn is not detected, but the mold closing completion position A0±α is detected, and a value of this mold closing completion position A0±α may be corrected and stored. In this case, an offset value with a predetermined width may be added to the corrected and stored mold closing completion position A0±α in a direction toward the mold opening side, and the operation start confirming position of the mold clamping cylinders may be set.

Moreover, in the present embodiment, it is confirmed that the mold closing completion position A0 is detected, and thereafter, it is detected that the mold clamping cylinders 21 operate; however, a concept of this also includes an embodiment in which it is confirmed that the mold closing completion position A0 is detected, and thereafter, the half nuts 45 are operated, then it is confirmed that the operation of the half nuts 45 is completed, and thereafter, the mold clamping cylinders 21 are started to operate. Moreover, the concept may include an embodiment in which such operation confirming positions as the mold closing completion position A are detected to thereby operate, for nozzle touch, an actuator of a nozzle touch device of the injection device 14, an actuator of a shut-off valve of the nozzle 43 or actuators of cores of the metal molds 15 and 17 or a variety of valves.

Moreover, an injection molding machine using a spring metal mold may be a machine in which the mold closing completion position A is determined when the mold opening/closing servo motors 31 detect predetermined torque. Furthermore, in an injection molding machine using an injection press, the mold closing completion position A may be determined at a point of time when such mold closing and mold abutment are performed first; however, an operation start confirming position of the next actuator may be determined at a point of time when, after the mold abutment, the mold opening/closing servo motors 31 are moved to the mold opening side to then stop at a position where to start the injection. Alternatively, in the injection molding machine using the injection press, the mold abutment does not need to be performed but the movable platen 18 may be stopped at an injection start position where the metal molds are spaced apart from each other by a fixed amount. Then, an operation start confirmation completing position may be determined in accordance with the fact that the engagement of the half nuts 45 is completed, and for the injection, the actuators of the servo motors and the hydraulic cylinders and the mold clamping cylinders 21 may be started to operate.

Still further, generally, the operation start confirming positions such as the mold closing completion position A are measured at the point of time when the movable platen 18 is stopped; however, confirmation of a predetermined operation start confirming position during the mold closing operation may be set as a trigger to start, for example, the operation of the actuators to operate the half nuts 45 and the operation of the mold clamping cylinders 21. Moreover, the present invention may include an injection molding machine in which, at the time of detecting the position of the movable platen 18 by the rotary encoders 40 of the mold opening/closing servo motors 31 in order to take measures against the thermal expansion of the mold opening/closing ball screws 33, an interval between the metal molds or an interval between the stationary platen 16 and the movable platen 18 is accessorily measured by a linear sensor such as an MTS sensor. Furthermore, the position of the movable platen 18 may be measured by a position sensor such as a linear sensor, and other controls may be performed using the position of the movable platen 18, which is detected by the position sensor at the time of the continuous molding. The other controls include starting the operation of the half nuts 45 and starting the injection by the injection device as well as starting the operation by the mold clamping cylinders. Moreover, the other controls also include starting to move the hydraulic cylinders to operate the cores, valve pins or the like of the metal molds.

Furthermore, in the present invention, the temperature of the ball screws 33 and the temperature of the metal molds may be measured using temperature sensors attached thereto, and the mold closing completion position A may be automatically arithmetically operated on the basis of changes of the temperatures of the ball screws 33 and the metal molds. Moreover, even if the temperature sensors are not actually attached, the thermal expansion of each of the ball screws 33 and the metal molds 15 and 17 may be arithmetically operated on the basis of the rotation speed of the ball screws 33, the movement of the movable platen 18, the number of the molding cycles, and the resin temperature, which are obtained from test results, and the operation start confirming position of the next actuator, such as the mold closing completion position A, may be changed.

Figure 4:
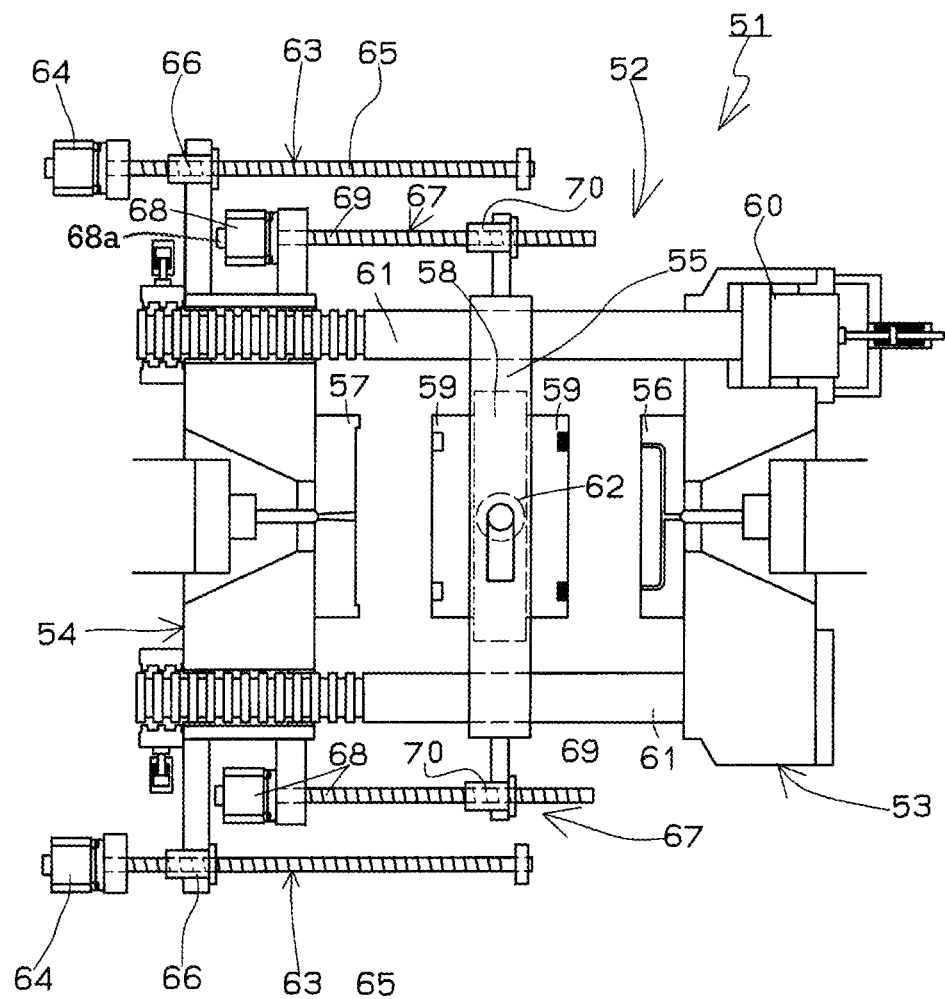
FIG. 4 is a schematic plan view of an injection molding machine according to another embodiment of the present invention.

Moreover, the present invention may be a mold clamping device 52 of an injection molding machine 51, in which an intermediate platen 55 that is a second movable platen is provided between a stationary platen 53 and a first movable platen 54, which are as described in FIG. 4, so as to be movable in the mold opening/closing direction. In a second embodiment, a stationary metal mold 56 is attached to the stationary platen 53, a movable metal mold 57 is attached to the first movable platen 54, a rotary platen 58 is attached to the vertically divided intermediate platen 55, and intermediate metal molds 59 and 59 are attached to both surfaces of the rotary platen 58. Then, mold clamping cylinders 60 are attached to the stationary platen 53, and tie bars 61 which are rods thereof are inserted through the intermediate platen 55 and the first movable platen 54. Then, the rotary platen 58 and the intermediate metal molds 59 are configured to rotate about a longitudinal shaft 62 with respect to the intermediate platen 55.

Moreover, mold opening/closing mechanisms 63 for the first movable platen 54 are individually disposed on an operation side and a non-operation side on a bed. Mold opening/closing servo motors 64 are fixed to the first movable platen 54 side of the bed, and ball screws 65 are coupled to drive shafts of the mold opening/closing servo motors 64. The ball screws 65 are axially held on both of the first movable platen 54 side and the intermediate platen 55 side. Then, ball screw nuts 66 are fixed to the first movable platen 54, and the ball screws 65 are inserted through the ball screw nuts 66. Moreover, rotary encoders 64a are attached to the mold opening/closing servo motors 64, and a position of the first movable platen 54 with respect to the bed or the stationary platen 53 is made detectable. Each of the mold opening/closing mechanisms 63 of the first movable platen 54 has a long effective length of the ball screw 65 since a mold opening/closing movement of the first movable platen 54 is large.

Moreover, mold opening/closing mechanisms 67 of the second movable platen are individually disposed so as to connect both sides of the first movable platen 54 and both sides of the intermediate platen 55 that is the second movable platen. Mold opening/closing servo motors 68 of the second mold opening/closing mechanisms 67 are fixed to the first movable platen 54, and ball screws 69 are coupled to drive shafts of the mold opening/closing servo motors 68. Then, ball screw nuts 70 are attached to both sides of the intermediate platen, and the ball screws 69 are inserted through the ball screw nuts 70. Then, rotary encoders 68a are attached to the mold opening/closing servo motors 68, and a position of the intermediate platen 55 that is the second movable platen with respect to the first movable platen 54 is made detectable.

Also with regard to the second embodiment, when the metal molds 56, 59, 57 and 59 are exchanged, then the mold opening/closing mechanisms 63 of the first movable platen 54 and the mold opening/closing mechanisms 67 of the second movable platen are operated for the mold closing, a mold thickness is measured, and the mold closing completion position A0 that is also the operation start confirming position of the mold clamping cylinders 60 is set. Then, a position where the mold clamping cylinders 60 are pressurized and a predetermined set pressure is detected is set as the mold clamping completion position B0. Then, the control at the time of the continuous molding is also executed in accordance with the same flowchart as in the first embodiment. Note that, in the second embodiment, two sets of the metal molds are moved in series in the mold opening/closing direction and each thereof is clamped. As a result, a stroke of the first movable platen 54 moved by the mold opening/closing mechanisms 63 of the first movable platen 54 is also increased. Accordingly, amounts of the thermal expansion of the metal molds 56, 59, 57 and 59 and the ball screws 65 are also increased, and the necessity of the present invention is increased.

Figure 5:
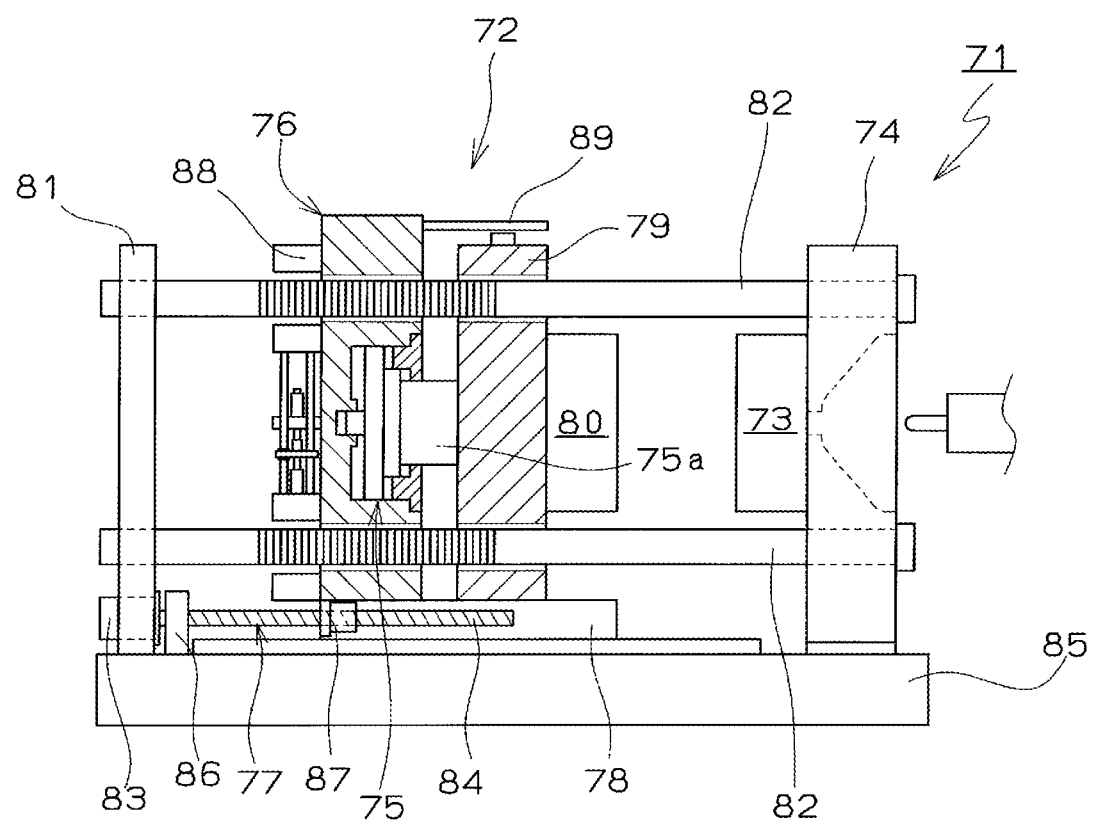
FIG. 5 is a schematic side view of an injection molding machine according to still another embodiment of the present invention.

Next, an injection molding machine 71 according to a third embodiment will be described with reference to FIG. 5. In a mold clamping device 72 of an injection molding machine 71, a first movable platen 76 that has a mold clamping cylinder 75 mounted thereon is made movable in the mold opening/closing direction by mold opening/closing mechanisms 77 with respect to a stationary platen 74 attached with a stationary metal mold 73. A base portion 78 of the first movable platen 76 extends forward, and a second movable platen 79 is mounted on the base portion 78 so as to be movable by a mold clamping stroke in the mold opening/closing direction. Then, the mold clamping cylinder 75 is disposed on a center of the first movable platen 76, a ram 75a of the mold clamping cylinder 75 is fixed to a back surface of the second movable platen 79. Then, a movable metal mold 80 is fixed to a metal mold attachment surface of the second movable platen 79. Moreover, between the first movable platen 76 and the second movable platen 79, a linear sensor 89 such as an MTS sensor that measures a distance between both thereof is attached. More on a rear of the first movable platen 76, a tie bar holder 81 is provided, and tie bars 82 are disposed between the tie bar holder 81 and the stationary platen 74. Then, the tie bars 82 are inserted through the first movable platen 76 and the second movable platen 79.

Mold opening/closing servo motors 83 of the mold opening/closing mechanisms 77 are individually fixed to a lower portion of the tie bar holder. Then, base end sides of ball screws 84 are axially held on bearing-attached holding portions 86 on the first movable platen 76 side on a bed 85. Ball screw nuts 87 are fixed to the base portion 78 of the first movable platen 76, and the ball screws 84 are inserted through the ball screw nuts 87. In the present embodiment, tip end sides of the ball screws 84 are not held by the bearing-attached holding portions provided on the bed 85, and are free ends. Note that the third embodiment may be an embodiment, in which a base under the second movable platen attached with the movable metal mold 80 extends rearward, and the first movable platen attached with the mold clamping cylinder is mounted on the base portion. In this case, one of the mold opening/closing mechanisms 77 for the movable platen is attached to a base portion of the second movable platen.

Then, also with regard to the third embodiment, when the metal molds 73 and 80 are exchanged, the mold opening/closing servo motors 83 of the mold opening/closing mechanisms 77 of the movable platen are driven for the mold closing in a state where the mold clamping cylinder 75 is provided with a predetermined mold clamping stroke, and when the metal molds 73 and 80 are caused to abut against each other, a mold thickness is measured, and the mold closing completion position A0 is set. Then, after engagement of the half nuts 88, a position where the mold clamping cylinders 75 are pressurized and a predetermined set pressure is detected is set as the mold clamping completion position B0.

Then, the control at the time of the continuous molding is also executed in accordance with a similar flowchart to that in the first embodiment. Note that, in the third embodiment, the ball screws 84 of the mold opening/closing mechanisms 77 are axially held on the holding portions 86 on the movable platen side, and have free ends on the stationary platen side. Accordingly, the ball screws 84 thermally expand only toward the stationary platen 74 side (from a left side to a right side in FIG. 5). As a result, an orientation of the thermal expansion of the metal molds 73 and 80 and an orientation of the thermal expansion of the ball screws 84 are opposed to each other, and both of the thermal expansions are added to each other, leading to a change of the mold closing completion position A0±α. Accordingly, the necessity of the present invention is further increased. Moreover, also in the injection molding machines of the types shown in FIG. 1 and FIG. 4, when the ends of the ball screws on the stationary platen side are set as free ends in a similar way to the injection molding machine in FIG. 5 in order to simplify structures, the necessity of the present invention is further increased.

Moreover, in the case where the injection molding machine includes a toggle-type mold clamping device, a pressure receiving platen is controlled to be retreated in response to the thermal expansion of each of the metal molds and the ball screws, and accordingly, the present invention is not used frequently. However, the present invention can be adopted in such a device as described in Japanese Patent Application Laid-Open No. 2009-255462, which performs mold closing control by a toggle mechanism and then performs mold clamping control by a mold clamping cylinder after the toggle mechanism reaches a mold closing position.

The present invention is not limited to the above-described present embodiments though modified examples thereof are not mentioned in detail, and it goes without saying that combinations of the above descriptions or additions or changes which are made based on the spirit of the present invention by those skilled in the art are also applicable. The injection molding machine of the present invention may be a machine provided with a vertical mold clamping device in which molds are opened and closed in the vertical direction.

What is claimed is:

1. A method for controlling an injection molding machine that transmits driving force of a mold opening/closing servo motor to a movable platen via a ball screw to move the movable platen with respect to a stationary platen, and thereafter clamps molds by a mold clamping mechanism, wherein the mold opening/closing servo motor is disposed on a bed or the stationary platen, and a ball screw nut is disposed on the movable platen, wherein the ball screw and molds are configured to thermally expand during a continuous molding, the method comprising:
   detecting by a rotary encoder additionally provided on the mold opening/closing servo motor a position of the movable platen;
   performing by another actuator an operation of the injection molding machine, the operation being of other than the mold opening/closing servo motor;
   controlling the other actuator via a control device only when it is confirmed that the movable platen has reached an operation start confirming position of the other actuator, the position being detected at a time of continuous molding by a rotary encoder additionally provided on the mold opening/closing servo motor, and
   performing by the control device a comparative arithmetic operation between a mold clamping completion position detected by the rotary encoder and a stored mold clamping completion position, or a comparative arithmetic operation between a mold closing completion position detected by the rotary encoder and a stored mold closing completion position, to correct the operation start confirming position to compensate for the thermal expansion of the ball screw and the molds.

2. The method for controlling an injection molding machine according to claim 1,
   wherein the other actuator is a mold clamping cylinder, , and
   the operation start confirming position of the mold clamping cylinder is corrected during a period of any molding cycle at the time of the continuous molding.

3. An injection molding machine for transmitting driving force of a mold opening/closing servo motor to a movable platen via a ball screw to move the movable platen with respect to a stationary platen, and for thereafter clamping molds by a mold clamping mechanism, wherein the ball screw and molds are configured to thermally expand during a continuous molding, the injection molding machine comprising:
   a rotary encoder additionally provided on the mold opening/closing servo motor and capable of detecting a position of the movable platen;
   another actuator that performs an operation of the injection molding machine, the operation being of other than the mold opening/closing servo motor; and
   a control device programmable to enable the other actuator to operate only when it is confirmed that the movable platen has reached an operation start confirming position of the other actuator, detects a position of the movable platen at a time of the continuous molding, and performs
      a comparative arithmetic operation between a mold clamping completion position detected by the rotary encoder and a stored mold clamping completion position, or
      a comparative arithmetic operation between a mold closing completion position detected by the rotary encoder and a stored mold closing completion position,
   to correct the operation start confirming position to compensate for the thermal expansion of the ball screw and the molds;
   wherein the mold opening/closing servo motor is disposed on a bed or the stationary platen, and the ball screw nut is disposed on the movable platen.

4. The injection molding machine of claim 3, further comprising:
   the ball screw to which a driving force of the mold opening/closing servo motor is transmitted;
   a ball screw nut disposed on the movable platen and into which the ball screw is inserted;
   a mold clamping cylinder of the mold clamping mechanism disposed on the stationary platen, the mold clamping cylinder including a rod that serves as a tie bar having a plurality of locking portions thereon; and
   a half nut including locking teeth which is configured to engage with the plurality of locking portions.

5. The injection molding machine of claim 4, wherein the control device is programmable to cause the half nut to engage with the plurality of locking portions of the tie bar to enable the mold clamping cylinder to operate when it is confirmed that the movable platen has reached the operation start confirming position of the half nut or the mold clamping cylinder, detects by the rotary encoder additionally provided on the servo motor, the position of the movable platen at the time of a mold closing completion position or a time when it is detected that a pressure of the mold clamping cylinder is increased to a preset pressure during continuous molding, and performs
the comparative arithmetic operation between the position detected by the rotary encoder and a previously stored position,
to correct the operation start confirming position, thereby preventing the rotary encoder from being unable to detect that the movable platen has reached the operation start confirming position of the mold clamping cylinder due to thermal expansion of the ball screw and the molds during the continuous molding.

* * * * *